June 30, 1942.  H. R. BATCHELOR  2,288,384
TEMPERATURE RESPONSIVE CONTROL DEVICE
Filed Aug. 27, 1940
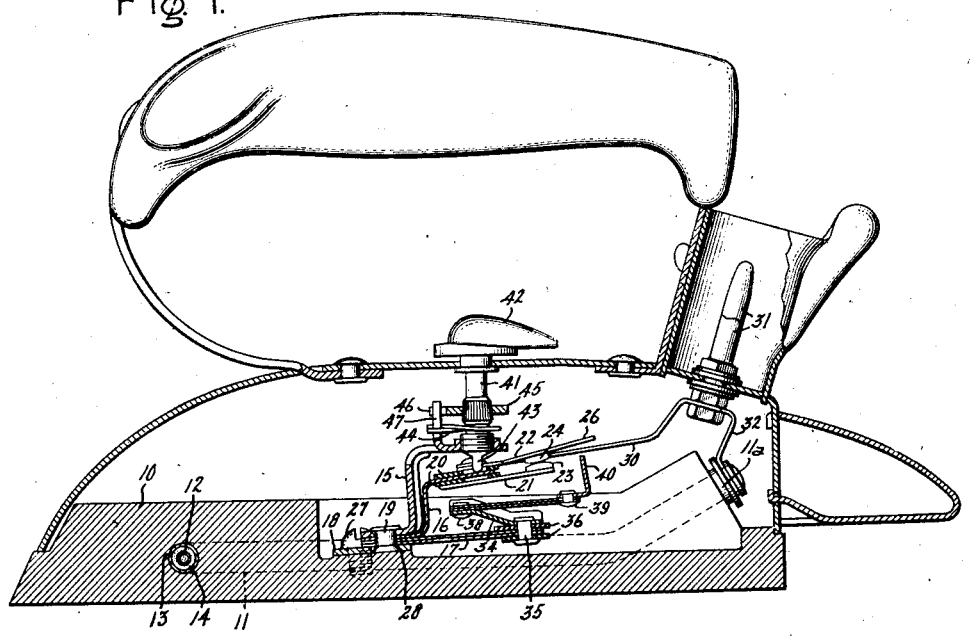
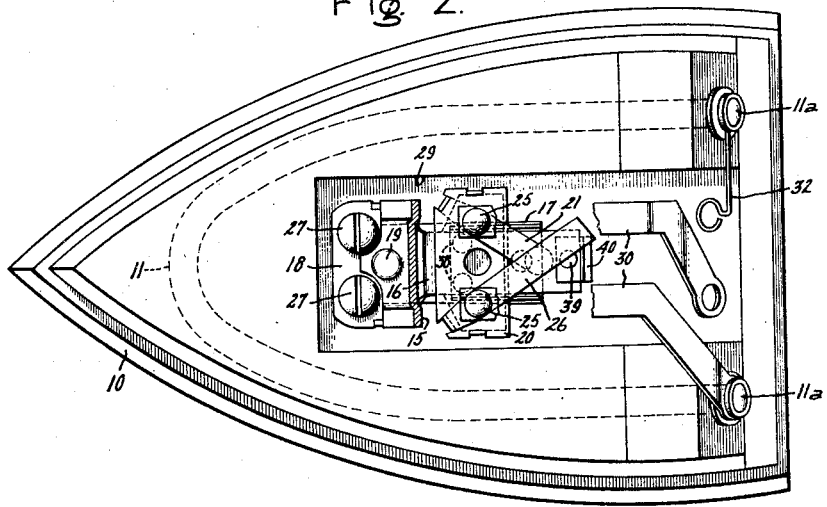
Inventor:
Harold R. Batchelor,
by Harry E. Dunham
His Attorney.

Patented June 30, 1942

2,288,384

UNITED STATES PATENT OFFICE 2,288,384

TEMPERATURE RESPONSIVE CONTROL DEVICE

Harold R. Batchelor, Ontario, Calif., assignor to General Electric Company, a corporation of New York Application August 27, 1940, Serial No. 354,380

7 Claims. (Cl. 200—138)

This invention relates to temperature control devices and more particularly to temperature control devices for controlling an electric circuit, such as an electric heating circuit, in response to temperature, and it has for its object the provision of simple, reliable and efficient device of this character which may be manufactured at low cost.

This invention is particularly applicable to temperature control devices for controlling the heating circuit of an electrically heated flatiron and similar electrically heated devices that have a heated solid medium. It will be understood, however, that this invention has more general applications and is not limited to devices that have a heated solid medium but may be used in other applications where the temperature of a fluid medium is to be controlled, such as the oven of an electric range.

In electrically heated devices it is desirable to place a controlling temperature responsive element in direct thermal relation with the medium whose temperature is being controlled. In most devices of this character it is not possible or desirable to place the entire temperature responsive element in direct thermal relation with the heated medium. In a flatiron, for example, only a portion of the temperature responsive element is clamped to the sole plate. This is desirable in order to have a portion of the element which is free to move to operate a heat controlling device. It has been found that where only a portion of the thermostat is in direct thermal relation with the heated medium there is a tendency for the temperature of the heated body or heated medium to rise more rapidly than does the temperature of the thermostat upon the initial heating of the device whose temperature is being controlled from its room temperature. With the present trend in flatirons to high wattage units and relatively light weight sole plates, this difference in heating effect has become particularly noticeable. Due to this rapid rise in temperature during the heating cycle there occurs a temperature overshoot, that is, the temperature at which the thermostat operates to shut off the heat in the first heat cycle is higher than the cut-off temperature of the succeeding cycles. In certain instances this overshoot in the first cycle might be so high that the iron will scorch certain fabrics if it is used when this overheated condition exists.

It is the primary object of this invention to provide simple, inexpensive and highly effective means of eliminating this temperature overshoot and thereby materially increasing the sensitivity of the control device.

In accordance with this invention, I provide a control device having a primary temperature responsive element which is adapted to be connected at one point in good thermal relation with the body or medium being heated. Mounted on this primary temperature responsive device so as to receive heat substantially by conduction therefrom is a second temperature responsive device which is oppositely arranged with respect to the first temperature responsive device. During the initial heating of the body or medium being controlled, the second temperature responsive device receives little heat from the primary temperature responsive device through its supporting means. However, during the initial cooling portion of the first cycle of operation the secondary temperature responsive device receives a considerable amount of heat from the primary temperature responsive device and deflects in a direction to cause closing of the heating circuit at a somewhat higher temperature than would be the case if the control device were not provided with such means. This has the effect of raising the operating temperatures of subsequent cycles of the control device to that of the first cycle thereby substantially eliminating the temperature overshoot of the first cycle.

In one specific form of this invention, the secondary temperature responsive element is secured to the free end of the primary temperature responsive element by means of a substantially Z-shaped metallic bracket. This bracket is mounted on the free end of the primary temperature responsive element and extends backwardly over this element so that the major portion of the secondary temperature responsive element which is secured to the opposite end of the bracket lies above the primary temperature responsive element and is thereby shielded from direct radiation from the body or medium being heated. Thus heat is transmitted to the secondary thermostat mainly by conduction through primary temperature responsive element and the bracket.

For a more complete understanding of this invention, reference should be had to the accompanying drawing in which Fig. 1 is an elevation mainly in section of an electrically heated flatiron provided with an improved temperature control device constructed in accordance with this invention; Fig. 2 is a plan view partly in section and partly broken away of the flatiron in Fig. 1 with the cover removed, showing additional details of my improved temperature control device; and Fig. 3 is an elevation partly in section showing my improved control device in a different circuit controlling position from that shown in Fig. 1.

Referring to the drawing, this invention has been shown in one form as applied to an electrically heated flatiron having a sole plate 10 that is formed of any suitable material such as cast iron or aluminum. Cast within the sole plate 10 is a sheathed heating element 11 preferably of the type described in United States patent to C. C. Abbott No. 1,367,341, dated February 1, 1921. As shown, this heating element comprises a helical resistance element 12 mounted in a tubular metallic sheath 13 and supported in spaced relation with reference to the sheath by a compacted layer of insulating material 14 which preferably will be powdered magnesium oxide. Heating elements of this type can easily be bent into desired shapes and, as shown, the heating element is formed roughly in the shape of a horseshoe having its terminals 11a at the heel of the iron and its apex at the toe of the iron.

Referring further to the drawing, my invention has been shown in one form as applied to a temperature control device of the type described and claimed in United States Patent 2,158,850, granted May 16, 1939, on an application filed by J. R. Campbell and assigned to the assignee of the present invention. It is to be understood, however, that my invention is not limited to this specific type of control device but has wide application to temperature responsive control devices in general.

As shown in the drawing, the control device comprises a substantially Z-shaped frame 15, a similarly shaped bracket 16 which is made of some suitable resilient material and a primary bimetallic element 17 which consists of two strips of material having dissimilar temperature coefficients of expansion, such as invar and steel, secured together lengthwise from end to end in any suitable manner as by welding. The bimetallic element is positioned with the element having the highest thermal coefficient of expansion arranged on its lower side so that upon an increase in temperature its free end deflects upwardly away from the sole plate 10 and upon a decrease in temperature it deflects downwardly toward the sole plate 10. The frame 15, the resilient bracket 16 and the bimetallic element 17 are all secured together at one end, the left end as viewed in the drawing, to a clamping plate 18 by means of a single rivet 19. Mounted on the outwardly extended portion of the bracket 16 and insulated therefrom by means of mica washers 20 are a substantially rigid contact arm 21 and a relatively flexible contact arm 22 upon which are mounted cooperating contacts 23 and 24, respectively. The resilience of the arm 22 is such that it biases the contact 24 against the contact 23 to produce a normally closed position of the contacts. As shown in Fig. 2, the contact arms 21 and 22 have their left ends secured to the resilient bracket 16 by means of rivets 25. The opposite ends of the switch arms are free to move and the resilient arm 22 has its one end 26 projecting beyond the position of the contact 24 for the purpose which will be described more fully hereinafter.

The clamping plate 18 with the frame 15, the bracket 16 and the bimetallic element 17 rigidly secured thereto is mounted in good thermal relation with the sole plate 10 by means of screws 27. Preferably the sole plate will be provided with an elevated seat 28 upon which the clamping plate is mounted as is clearly shown in Fig. 1. Also preferably this seat 28 will be arranged in the bottom of a recess 29 provided in the sole plate as is clearly shown in Fig. 2.

Suitable leads 30 are provided for connecting the contact arms 21 and 22 in series with the heating element 11 and with the terminal pins 31 to which a plug of a suitable supply line is adapted to be connected. One of the leads 30 is arranged to connect the relatively movable arm 22 to one of the terminals 11a of the heating element and the other lead 30 is arranged to connect the relatively fixed arm 21 to one of the supply terminals 31. The other terminal 11a of the heating element is connected to the remaining supply terminal by means of an additional lead 32.

Even though the primary bimetallic element 17 is secured directly in thermal relation with the sole plate 10 through the clamping plate 18 and even though its movable portion lies relatively close to the sole plate in overhanging relation as shown and even though the bar is mounted in the recess 29, nevertheless there results a considerable temperature overshoot in the first heat cycle. This is due to the fact that the bimetallic element is in direct thermal relation with the heated body 10 only at the point where the fixed end is secured to the body and in order for the opposite or free end to be heated, heat must be transmitted thereto substantially entirely by conduction along the bimetal element. The bimetal element, of course, has some thermal resistance to the flow of heat from its fixed end to the movable end. Therefore, upon the initial heating up of the body 10 there is established an initial temperature gradient along the bimetallic element with the high temperature of the gradient existing at its fixed end. The magnitude of this initial temperature gradient depends upon the thermal resistance of the bimetallic element, the rate at which heat is introduced into the sole plate and the rate at which heat from the sole plate is imparted to the fixed end of the element.

The manifestation of this temperature gradient is a time lag in the heating up of the bimetal 17 as compared with the light weight sole plate 10 when the heating unit 11 is energized. Because of this time lag in the temperature rise of the bimetallic element, only that portion of the element closest to the fixed end is effective to interrupt the heating circuit of the heating element 11 during the first heat cycle. This means that a greater deflection is required of the bimetallic element in order to perform its circuit controlling function and this greater deflection requires additional time which means that the length of time that the sole plate is energized is greater thus resulting in a cut-off temperature which is considerably higher than would be the case if the entire length of bimetal blade were uniformly heated to its saturated condition and utilized to deenergize the heating element.

During the heating portion of the first cycle of operation and also during the cooling portion of this cycle, the bimetal element is heated by the flow of heat from the sole plate through the element to its free end. Eventually the element attains a saturated temperature condition, that is, a temperature condition wherein a final temperature gradient is established from the fixed end of the bar to its free end. This gradient is materially less than the initial gradient and remains substantially unchanged during the following heat cycles of operation of the control device although the magnitude of the temperatures at each end of the bimetallic element changes with changes in the sole plate temperature.

It has been found that the bimetal element 17 will generally attain a saturated temperature condition during the first heating and cooling cycle. However, due to the high initial temperature gradient along the bimetallic element, the element continues to receive heat during the cooling portion of the cycle thus causing the free end of the bimetallic element to continue to deflect upwardly in the circuit opening direction. Eventually the bimetallic element attains a saturated condition and this together with cooling of the sole plate will initiate a downward deflection of the element. However, due to the fact that the element has deflected upwardly during an initial portion of the cooling period, the closing of the heating circuit is delayed since the downward deflection required to cause closing of the contacts has been increased. This has the effect of increasing the time which the heating circuit is deenergized during the first cycle of operation and thereby increasing the temperature difference between the off position of the first cycle of operation and the on position of the second cycle of operation. This further accentuates the overshoot of the first cycle. In addition, with the bimetallic element reaching a saturated condition before the beginning of the second cycle of operation, the entire length of bimetal will deflect upwardly during the heating portion of the second and succeeding cycles of operation so as to produce a premature cut-off or deenergization of the heating circuit. This premature cut-off of course depresses the cut-off temperature of the second and succeeding cycles and thus still further accentuates the overshoot of the first cycle.

In order to overcome these difficulties and to provide a control device in which the cut-off and cut-on temperatures of the first cycle of operation will be the same as the cut-off and cut-on temperatures of the succeeding cycles of operation, I have provided a secondary bimetallic element 33 which is fixed at one end to a substantially elongated Z-shaped heat conducting bracket 34 which in turn is secured by means of a rivet 35 to the free end of the primary bimetallic element 17, suitable insulating washers 36 being provided to insulate electrically the bracket from the bimetallic element 17. The washers 36 are preferably of mica which is a relatively good heat conductor and does not substantially affect the transfer of heat by conduction between the bracket and the bimetallic element. The bracket 34 is shaped and positioned so as to extend backward over the bimetallic element 17 and in order to increase the rigidity of this bracket flanges 37 are provided along each edge thereof. The secondary bimetallic element 33 is rigidly secured to the bracket by means of a pair of rivets 38 and the element is arranged so that its high expanding side forms the top surface thereof. Thus upon an increase in temperature this secondary bimetallic element will deflect downwardly toward the sole plate 10 and upon a decrease in temperature will deflect upwardly. Secured to the opposite or free end of the bimetallic element 33 by means of a rivet 39 is an L-shaped bracket 40 which is adapted to engage the extension 26 of the flexible contact arm 22 so as to cause movement of the contact 24 relative to the contact 23 in response to temperature changes. The width of the bimetallic element 33 is substantially less than the width of the primary bimetallic element 17 and since the bracket 34 extends backwardly over the element 17 the secondary bimetallic element 33 will be substantially shielded from the direct radiation of heat thereto from the sole plate 10. Thus the secondary bimetallic element 33 will receive substantially all of its heat by conduction along the primary element 17 and the bracket 34. Some heat, of course, will be transmitted to the element by convection from air within the iron casing but this is a relatively negligible quantity as compared to the heat transmitted to the bimetallic element by conduction.

In addition to producing the shielding effect discussed above, the particular mounting of the bracket 34 and secondary element 33 illustrated makes it possible to obtain compensation of temperature overshoot without increasing the over all length of the control device.

Considering the operation of my improved means for compensating for temperature overshoot it will be assumed that the sole plate 10 is cold and contacts 23 and 24 are in the closed position shown in Fig. 1. Upon connecting the device to a source of supply the unit 11 will be energized and the sole plate 10 will be heated thereby. As the temperature of the sole plate rises, heat will be transmitted by conduction, radiation and convection but mainly by the former to the primary bimetallic element causing this element to deflect upwardly. In this initial operation, the aforedescribed initial temperature gradient will be set up in the element 17 and the element will deflect upwardly an amount sufficient to cause the bracket 40 to engage the extension 26 of the movable arm 22 to open the heating circuit by moving the contact 24 upwardly relative to the contact 23. During this initial heating, substantially no change takes place in the position or the deflection of the secondary bimetallic element 33 due to the shielding effect of the primary element.

After the contacts 23 and 24 have been separated, the sole plate 10 will begin to cool. However, as previously described, heat will continue to flow into the element 17 until the aforedescribed steady state temperature gradient is established in this element. At the same time, heat will be conducted from the primary bimetallic element to the bracket 34 and into the secondary bimetallic element 33 so as to initiate a downward deflection of this element. The size and shape of the secondary bimetallic element are selected so that its downward deflection during the saturation of the primary bimetallic element compensates for or balances out the continued upward deflection of the primary bimetallic element while it is saturated. Thus, instead of the contacts 22 and 23 being moved farther and farther away from each other as the saturation of the element 17 continues, their position relative to each other remains substantially unchanged from their original circuit opening position.

Before the cooling phase of the first cycle of operation has been completed the element 17 and the element 33 will have reached a saturated condition. When this condition is attained, the bimetallic element 33 will have deflected downwardly an amount sufficient to completely offset the continued upward deflection of the element

17 during the saturation thereof so that the relative position of the contacts 23 and 24 remains substantially unchanged after the initial opening thereof.

After continued cooling of the sole plate 10 for a predetermined length of time, the element 17 will begin to deflect downwardly causing a downward movement of the bracket 40. Due to its resilience, the arm 22 will follow this movement and upon the occurrence of a predetermined low temperature of the sole plate 10 the contacts 23 and 24 will be closed and the heating unit 11 reenergized. Since the element 33 has offset the continued upward deflection of the element 17, the temperature at which the contacts 23 and 24 are reclosed is considerably higher than would be the case if my improved compensating means were not employed. Thus instead of having a delay in the reenergization of the heating unit 11 in the second heating cycle and succeeding heating cycles, the reenergization is actually accelerated and the temperature differential between the cut-off temperature of the first cycle of operation and the cut-on temperature of the second and succeeding cycles of operation is decreased.

Upon the reenergization of the heating unit 11 the sole plate 10 heats up and heat is transmitted to the primary bimetallic element 17. Due to the fact that the secondary bimetallic element 33 is shielded from the sole plate and the fact that the temperature within the casing of the iron is substantially the same as the temperature which the secondary bimetallic element attains, there is very little change in the deflection of the secondary bimetallic element during the cooling of the primary bimetallic element. This means that the bracket 40 is spaced a greater distance from the arm 26 at the beginning of the second cycle of operation than at the beginning of the first cycle of operation by an amount equal to the downward deflection of the secondary element 33. Thus the bimetallic element 17 must deflect upwardly an increased amount in order to cause opening of the contacts 23 and 24. This means that the cut-off temperature of the second and succeeding cycles of operation will be raised by an amount which depends upon the proportions of the secondary bimetallic element. These are so chosen that the second cut-off temperature is raised to substantially the cut-off temperature of the first cycle of operation. Thus, instead of having a premature cut-off in the second and succeeding cycles of operation as is the case when only a single bimetal element is employed, the cut-off is delayed an amount sufficient to substantially eliminate any difference between the cut-off temperature of the first cycle and the remaining cycles, thereby substantially eliminating temperature overshoot due to this condition.

After the first cycle of operation, the two bimetal elements operate substantially as a unit in which all of the changes in temperature manifest themselves in a change in deflection of the primary element 17. The deflection of the secondary element 33 remains substantially unchanged once it attains its saturated condition in the first cycle of operation. Thus after the first cycle the element 33 functions substantially as an ordinary metal bracket having a prearranged curvature or deflection. The important difference, however, lies in the fact that the deflection or curvature of the element 33 is automatically adjusted with each cut-off temperature setting of the control device to reduce temperature overshoot.

In order to provide a temperature adjustment for my improved control device I have provided means which is substantially the same as that disclosed in the aforementioned Campbell patent and which comprises an adjusting screw 41 which is operable from outside of the casing of the flatiron by means of a knob 42. This adjusting screw 41 is threadedly mounted in the bracket 15 and is provided with a rounded end 43 which is adapted to engage the resilient bracket 16. By rotating the adjusting screw to vary the position of the rounded end 43, the relative position of the contact assembly comprising the relatively stationary and the relatively movable contact arms 21 and 22 and particularly the free end 26 of the contact arm 22 may be varied relative to the end of the bracket 40. By thus varying the distance between the bracket 40 and the extension 26, the amount of free deflection required of the bimetal assembly in order to cause the bracket 40 to engage the arm 26 may be varied and thus the temperature setting of the device may be altered. By rotating the adjusting screw 41 so that the end 43 is moved downwardly, the cut-off temperature of the control device is decreased and by rotating the adjusting screw in the opposite direction the cut-off temperature is increased. A coil spring 44 is provided to produce a frictional restraint on the adjusting screw 41 so that any particular temperature setting will be maintained and a washer 45 is mounted on the adjusting screw and is provided with an abutment 46 which engages an upturned tang 47 to limit both the clockwise and counterclockwise rotation of the adjusting screw.

From the foregoing detailed description, it is believed that the manner in which my improved control device operates is apparent and no further description of the operation is required.

It is to be particularly observed from the foregoing that I have provided new, improved and inexpensive means by which temperature overshoot in a temperature responsive control device to be used for controlling the temperature of a medium may be substantially eliminated. It is to be particularly observed that I have provided simple and effective means for eliminating temperature overshoot in electrical devices such as electrically heated flatirons. One of the important features of my improved means is the provision of a secondary bimetallic element which is so located relative to the primary bimetallic element that it will be substantially shielded thereby. Once this secondary bimetallic element reaches a saturated or steady-state temperature condition for any particular temperature setting of the control device, its deflection will remain substantially unchanged throughout the continued operation of the control device. This steady-state condition is usually reached during the first cycle of operation of the control device so that the second and succeeding cycles are all effected in the same manner by the deflection of the secondary bimetallic element and the secondary bimetallic element is designed so that this deflection will compensate for the variations in operation of a primary bimetallic element occurring in the first cycle of operation as compared with the second and succeeding cycles of operation.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A temperature control device for a heated medium comprising a bimetallic element having one end secured in direct thermal relation with said medium and its opposite end free to move, control means for controlling the application of heat to said medium operated by movement of said free end of said bimetallic element, and means for preventing the temperature attained by said medium in the first cycle of operation of said control means from substantially exceeding the temperature attained in the second and succeeding cycles of operation of said control device, said means comprising a secondary bimetallic element and a heat conducting bracket for mounting said bimetallic element on said free end of said primary bimetallic element so that said primary bimetallic element substantialy shields said secondary bimetallic element from direct radiation from said heated medium.

2. A temperature control device for a heated medium comprising a primary thermostat having a substantially fixed portion mounted in direct thermal relation with said medium and a relatively movable portion removed from direct thermal relation with said medium, a heat conducting bracket secured to said movable portion and extending backwardly over said thermostat, a secondary thermostat secured at one end to said bracket and extending in substantially the same direction as said primary thermostat so as to be shielded by said primary thermostat from the transmission of heat thereto by radiation from said heated medium, and control means associated with said secondary thermostat for controlling the application of heat to said medium in response to the combined movement of said primary and secondary thermostats in accordance with temperature changes, said combined movement being effective to make the cut-off temperature of the second and succeeding cycles of operation of said control device substantially the same as the cut-off temperature of the first cycle of operation so that temperature overshoot of the control device in the first cycle of operation is substantially eliminated.

3. A control device for controlling the application of heat to a heated medium in accordance with temperature changes comprising a primary bimetallic element having one end secured in direct thermal relation with respect to said heated medium and its opposite end remote from said heated medium and free to move toward said medium upon an increase in temperature and away from said medium upon a decrease in temperature, a substantially Z-shaped heat conducting bracket mounted on said free end of said primary element and extending backward therefrom, a secondary bimetallic element having one end fixed to said Z-shaped bracket so that it overlies said primary bimetallic element and is substantially shielded thereby, the opposite end of said secondary bimetallic element being free to move toward such medium when heated, and control means associated with said secondary bimetallic element and adapted to be actuated to different controlling positions in accordance with the combined movement of said primary and said secondary elements.

4. In a control device for controlling the application of heat to a heated medium in accordance with temperature changes, a primary bimetallic element having one end secured in direct thermal relation with said heated medium and its opposite end free to move to perform a controlling function, and means for compensating for the difference in movement of said primary bimetallic element during its first cycle of operation as compared with its second and succeeding cycles of operation, said means comprising a secondary bimetallic element and a heat conducting bracket for mounting said secondary bimetallic element adjacent the free end of said primary bimetallic element so that said primary bimetallic element substantially shields said secondary element from the transmission of heat thereto by radiation from said heated medium.

5. A temperature control device for a heated medium comprising a primary thermostat having one portion secured in direct thermal relation with said heated medium and a second portion free to move away from said heated medium upon an increase in temperature and toward said medium upon a decrease in temperature, a heat conducting bracket mounted on said second portion and extending backwardly thereover, a second thermostat mounted on said bracket so as to have a portion which is free to move towards said heated medium upon an increase in temperature and away from said heated medium upon a decrease in temperature, said second thermostat having a width substantially less than said first thermostat and substantially overlying said thermostat so as to be shielded thereby, and control means associated with said movable portion of said second thermostat so as to be actuated to different controlling positions in accordance with the combined movement of said first and second thermostats in accordance with temperature changes, said combined movement of said first and second thermostats being effective to make the cut-off temperature of the second and succeeding cycles of operation of the control device substantially the same as the cut-off temperature of the first cycle of operation of the control device.

6. In a control device for controlling an electrically heated flatiron in response to temperature changes of a sole plate, a primary bimetallic element of substantial width having one end secured to said sole plate and its opposite free to move away from said sole plate upon an increase in temperature and towards said sole plate upon a decrease in tempearture, means for compensating for the abnormally large movement of said primary thermostat during the first cycle of operation of said control device, said means comprising a heat conducting bracket secured to the free end of said primary thermostat and extending backwardly thereover and a secondary bimetallic thermostat having a width less than the width of said primary thermostat mounted on said bracket so as to have one end fixed and its opposite end free to move toward said sole plate upon an increase in temperature and away from said sole plate upon a decrease in temperature.

7. A temperature control device for an electrically heated flatiron having a sole plate and an electrical heating element therefor comprising control means for controlling the energization of said heating element in a series of on and off cycles so that a predetermined temperature of said sole plate is maintained, bimetallic temperature responsive means for securing said bimetallic element to said sole plate so that one portion is in direct thermal relation with said sole plate and another portion is free to deflect away from said sole plate upon an increase in temperature and toward said sole plate upon a decrease in temperature, means for compensating for the increased movement of said bimetallic element in the first on and off cycle of operation of said control means, said means comprising a heat-conducting Z-shaped bracket mounted near the free end of said bimetallic element and extending backwardly thereover and a second bimetal element mounted on said bracket so as to deflect toward said sole plate upon being heated by the heat transmitted thereto by conduction through said first mentioned element and said bracket, and means secured to said second bimetal element for actuating said control means in accordance with the combined movement of said bimetal elements with temperature changes.

HAROLD R. BATCHELOR.